United States Patent [19]
Arzenton et al.

[11] Patent Number: 5,975,121
[45] Date of Patent: Nov. 2, 1999

[54] TAP/PRESSURE REGULATOR ASSEMBLY FOR A GAS BOTTLE AND A GAS BOTTLE EQUIPPED WITH SUCH AN ASSEMBLY

[75] Inventors: Marco Arzenton; Bruno Beaco, both of Verona, Italy; Gilles Cannet, Parmain, France; Didier Lasnier, Vaureal, France; Philippe Pisot, L'Isle Adam, France; Stephane Thouvier, Sannois, France

[73] Assignee: L'Air Liquide, Societe Anonyme pour l'Etude et l'Exploitation des Procedes Georges Claude, Paris Cedex, France

[21] Appl. No.: 08/657,964

[22] Filed: Jun. 4, 1996

[30] Foreign Application Priority Data

Jun. 8, 1995 [FR] France ...................... 95 06784

[51] Int. Cl.⁶ .................................................. F16K 27/12
[52] U.S. Cl. .......................... 137/377; 137/382; 137/557
[58] Field of Search .................... 137/377, 382, 137/557

[56] References Cited

U.S. PATENT DOCUMENTS

| | | | |
|---|---|---|---|
| 2,500,214 | 3/1950 | Stroop | 137/382 |
| 2,946,223 | 7/1960 | Lauer, Jr. | 137/382 |
| 4,600,033 | 7/1986 | Baron | 137/382 |
| 4,678,003 | 7/1987 | Griffin | 137/382 |
| 5,009,249 | 4/1991 | Fisher et al. | |
| 5,429,152 | 7/1995 | Van Straaten et al. | 137/377 |

FOREIGN PATENT DOCUMENTS

| | | |
|---|---|---|
| 0 275 242 | 7/1988 | European Pat. Off. . |
| 0 308 875 | 3/1989 | European Pat. Off. . |
| 0 443 283 | 8/1991 | European Pat. Off. . |
| 0 467 769 | 1/1992 | European Pat. Off. . |
| 34 41 348 | 5/1986 | Germany . |
| 86 802 | 8/1987 | Luxembourg . |

*Primary Examiner*—A. Michael Chambers
*Attorney, Agent, or Firm*—Young & Thompson

[57] ABSTRACT

The tap/pressure regulator assembly, advantageously housed in a streamlined cowl forming a bottle-handling bonnet (C), comprises a body (1) intended to be mounted on a gas bottle and defining, on the inside, a gas utilization circuit, going to an outlet (3) via an isolating valve actuated by a lever (5) and via an adjustable pressure regulator (4, 25), and an independent filling circuit going from a filling fitting (6). The body (1) also carries high-pressure and low-pressure pressure gauges (8).

Application especially to welding gases.

FIG. 2 to be reproduced.

21 Claims, 5 Drawing Sheets

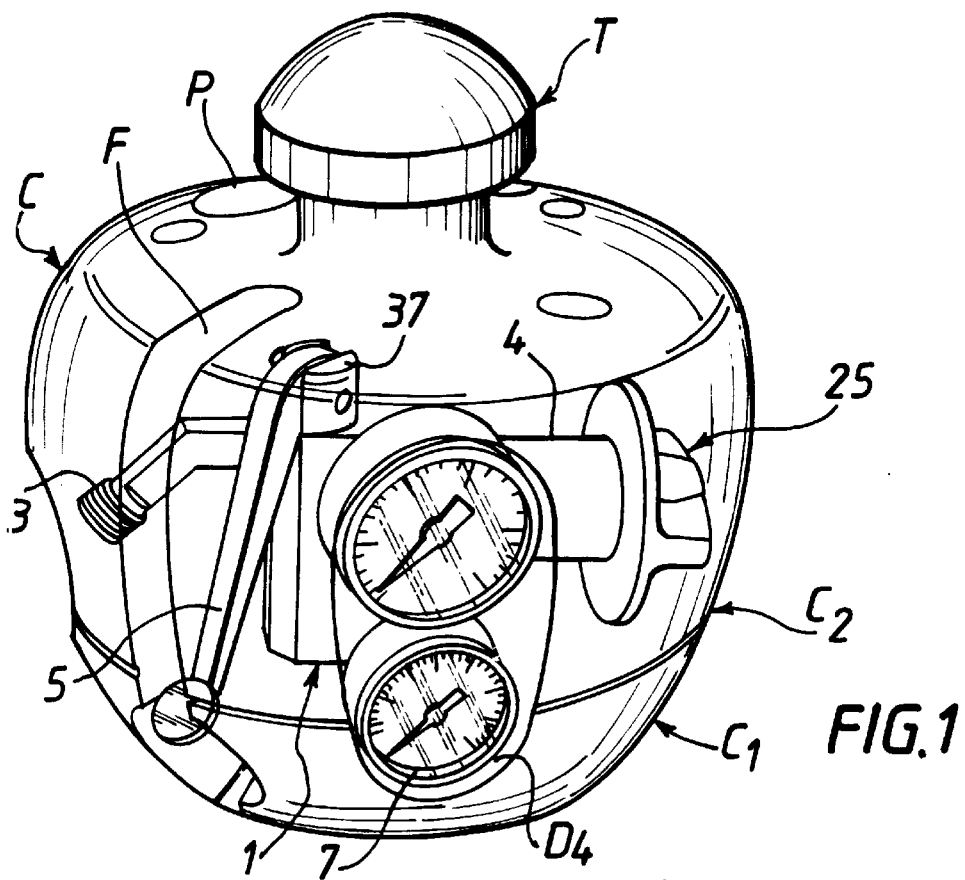
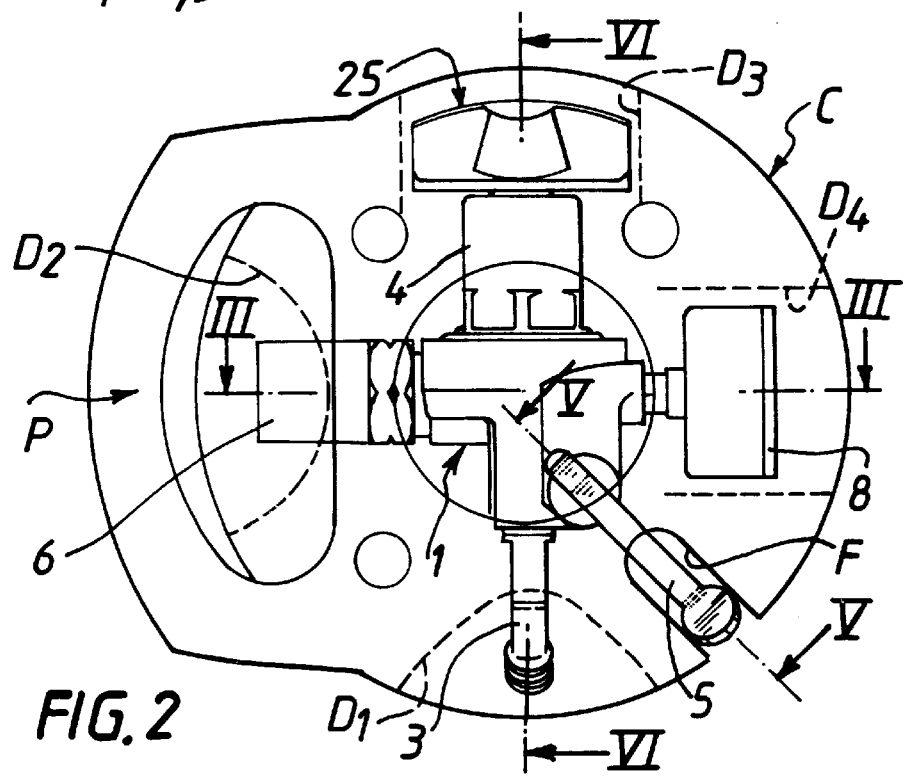

TAP/PRESSURE REGULATOR ASSEMBLY FOR A GAS BOTTLE AND A GAS BOTTLE EQUIPPED WITH SUCH AN ASSEMBLY

The present invention relates to a tap/pressure regulator assembly nor a pressurized-gas bottle, of the type defining a first gas circuit which includes, in series, a high-pressure circuit portion, an isolating valve, a pressure regulator and a low-pressure circuit portion.

Conventionally, pressurized-gas battles were equipped with a tap which had to be connected to a pressure regulator available on site, with the associated drawbacks of connecting/disconnecting operations. Combined tap/pressure regulator assemblies have therefore recently been proposed, in particular in the medical field, which can be connected directly to at least one low-pressure utilization circuit. Such an assembly is described in the document EP-A-629,937, in which the isolating valve is actuated by moving a subassembly incorporating a flow-rate adjustment device and by moving a preset pressure regulator.

The object of the present invention is to propose an improved tap/pressure regulator assembly, of particularly robust and compact design enabling it to be integrated into a suitable cowl, which is enhanced both ergonomically and from a security standpoint and which is suitable for many applications, especially in the field of welding.

In order to achieve this, according to one characteristic of the invention, at least the high-pressure and low-pressure portions of the first gas circuit are formed in a body having a base intended to be mounted on the gas bottle and the assembly includes a means for actuating the isolating valve, which means is mounted on the body and able to be moved between an open position and a closed position.

According to other particular characteristics of the invention:
  the assembly includes a second gas circuit formed in the body, separate from the first circuit, for the filling of the bottle when the assembly is mounted on this bottle;
  the assembly includes means for manually adjusting the pressure regulator which advantageously extends along an axis substantially orthogonal to the axis of the mounting base of the body.

The subject of the present invention is also an assembly of the type defined hereinabove which is provided with a protective cowl also mounted on the bottle and forming a bonnet for handling the latter.

According to one particular characteristic of the invention, the tap/pressure regulator assembly is completely housed in the cowl, which includes windows for access to the various inlets and outlets of the assembly.

Finally, the subject of the present invention is a pressurized-gas bottle equipped with an assembly as defined hereinabove.

Other characteristics and the advantages of the present invention will emerge from the following description of embodiments given by way of illustration but without any limitation, made in conjunction with the appended drawings in which:

FIG. 1 is a perspective view of an assembly according to the invention in place in a cowl depicted in phantom lines;

FIG. 2 is a diagrammatic top view of the cowled assembly in FIG. 1;

Figure 3:
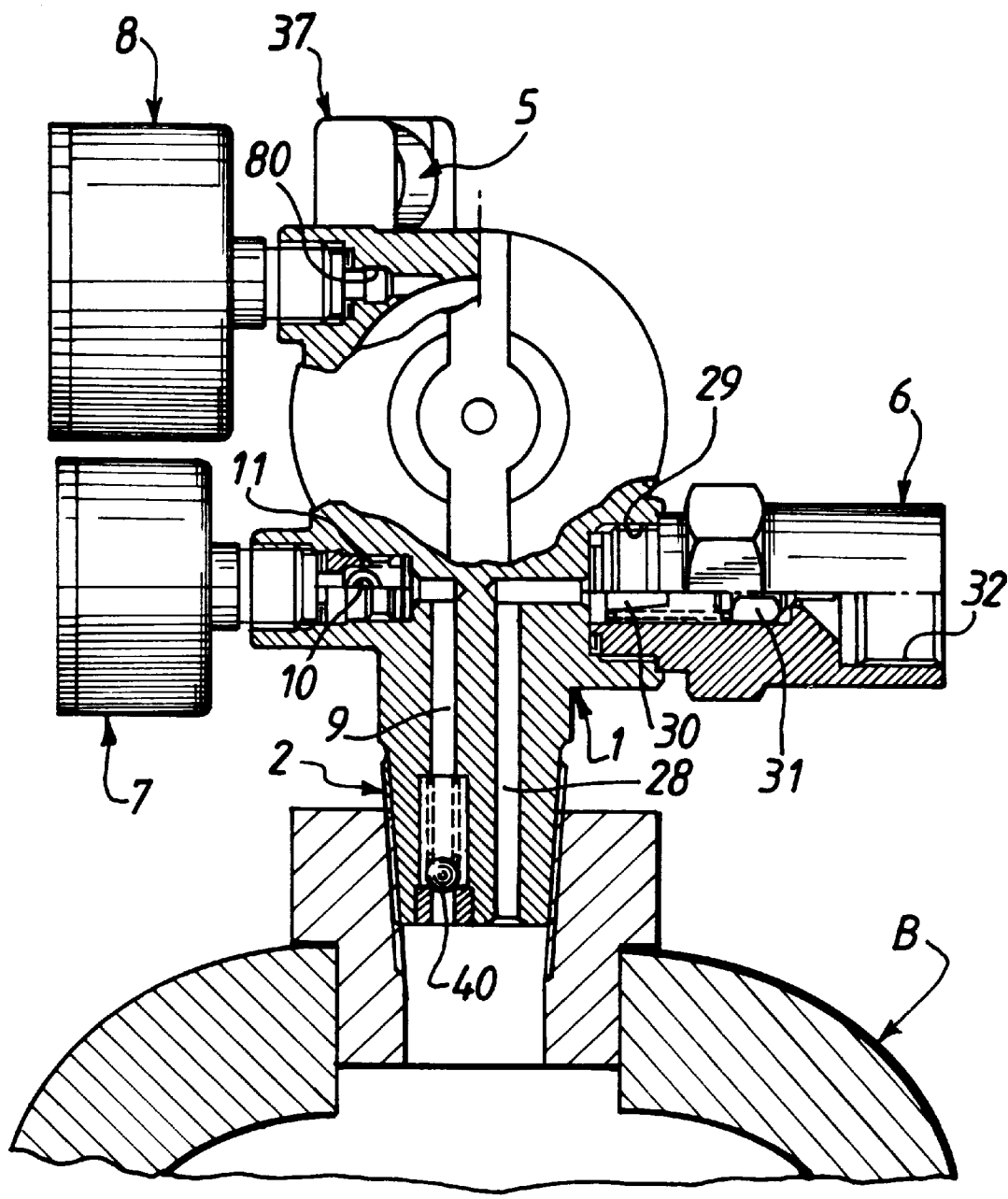
FIG. 3 is a view in partial section along the line of section III—III of the assembly in FIG. 2 mounted in position on a gas bottle.
Figure 4:
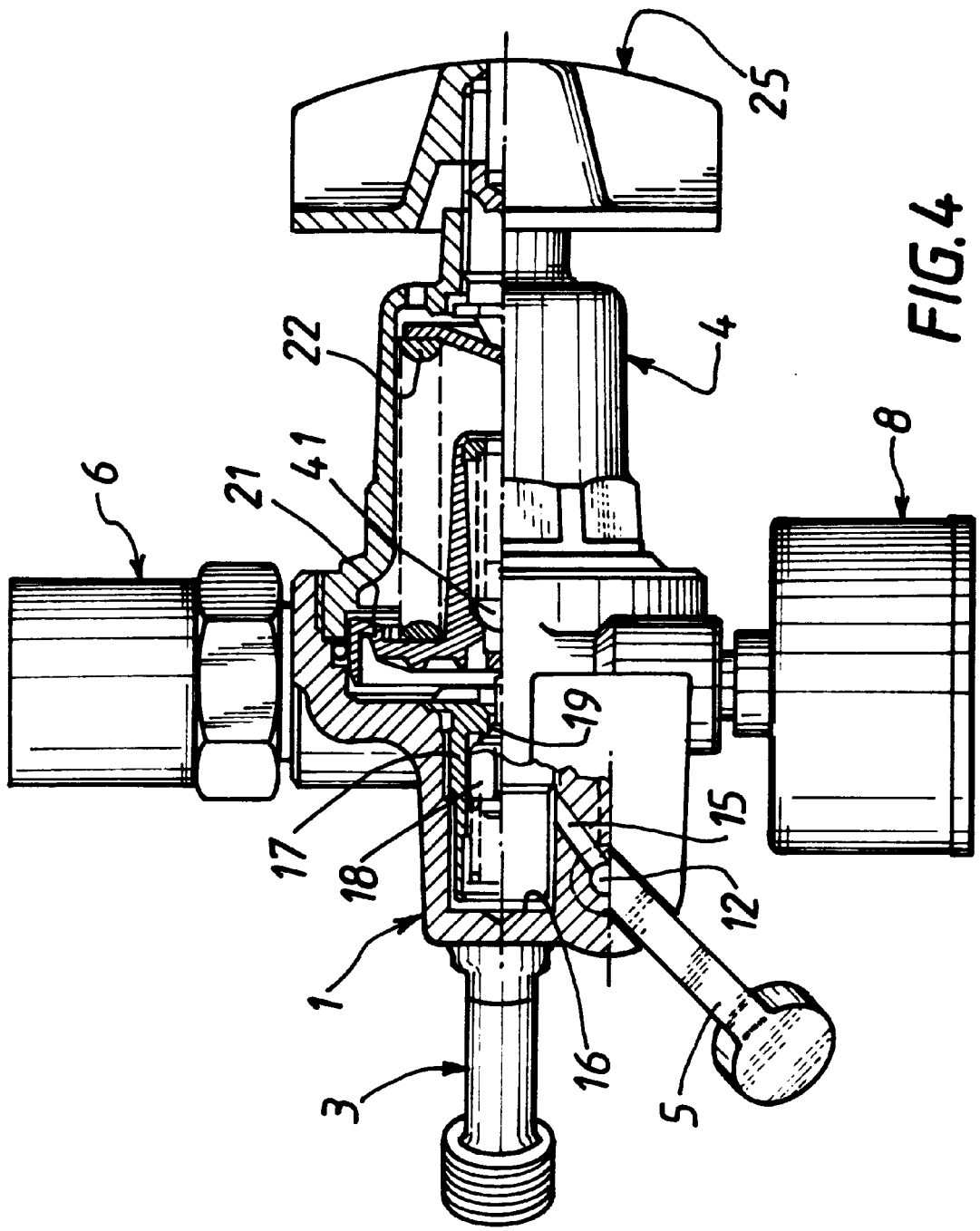
FIG. 4 is a top view, in partial longitudinal section, of the assembly in FIG. 2.
Figure 6:
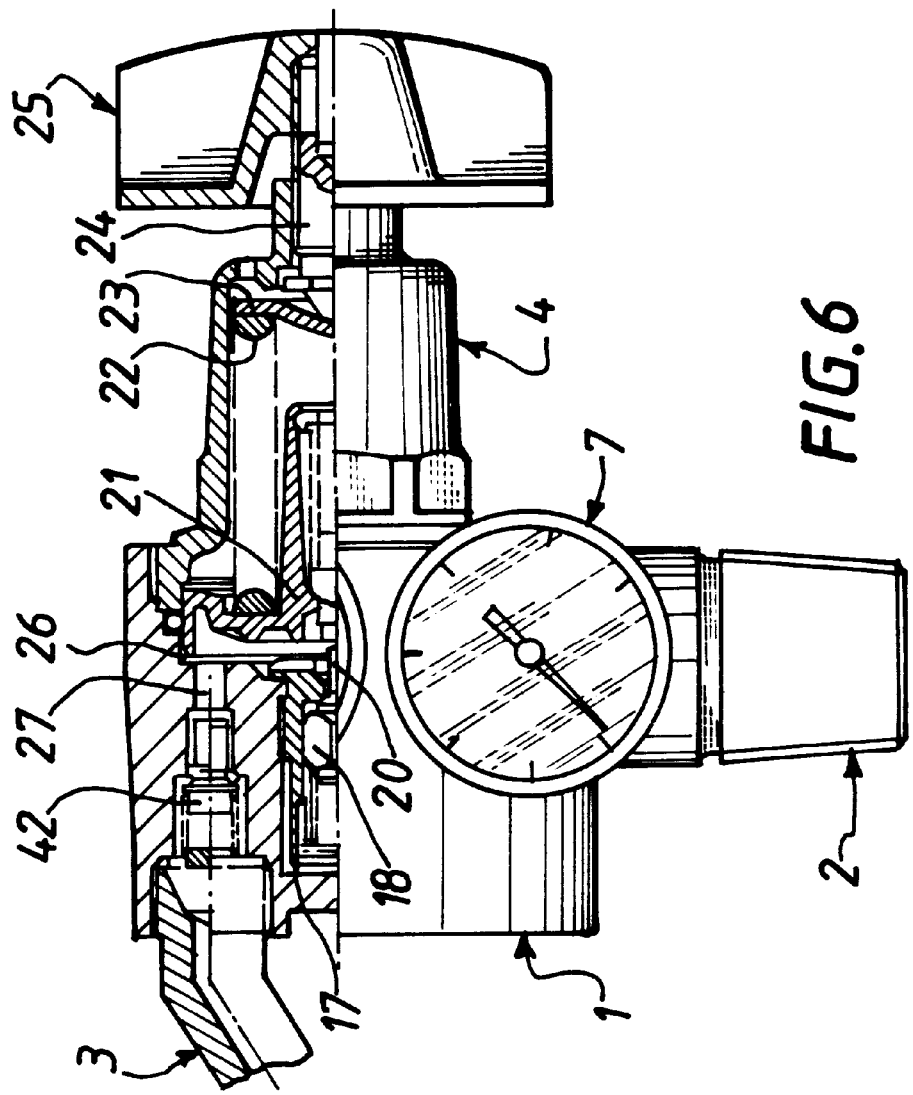
FIG. 6 is a side view in partial section along the line of section VI—VI in FIG. 2.

In the drawings may be recognized a compact tap/pressure regulator assembly essentially composed of a metal body 1 having a profiled lower end forming a mounting base 2 and on the metal body are attached, as will be seen in detail later, an outlet fitting 3, a pressure regulator housing 4, an operating lever 5, a filling fitting 6, a high-pressure pressure gauge 7 and a low-pressure pressure gauge 8.

As may be more clearly seen in FIGS. 3 to 6, the body 1, made of brass for example, defines, on the inside, a utilization circuit consisting of a high-pressure circuit portion comprising: an upstream part 9 which extends into the base 2, substantially parallel to the axis of the latter, and which opens into a transverse passage 10 used for mounting the HP pressure gauge 7 and itself communicating with a transverse passage 11 which itself opens into a stepped bore 12 accommodating the isolating valve 13 and forming a seat 14 for the latter; the circuit portion downstream of the seat 14 of the stepped bore 12 communicates, via a transverse passage 15, with a stepped cylindrical chamber 16 opening to the outside of the body 1 via an enlarged-diameter opening in which the annular end of the pressure regulator housing 4 is mounted. It will be noted that, since it is in permanent communication with the storage volume in the bottle B, the HP pressure gauge 7 also acts as a filling gauge for the bottle. Mounted in the small-diameter part of the chamber 16 is a separate subassembly comprising a tubular cage 17 housing a control valve 18 and forming a seat 19 for the latter. The valve 18 includes a front rod portion 20 extending beyond the seat 19 and capable of acting cooperatively with the front face of a pressure regulator piston 21 sliding in the body 1 and the housing 4 being urged towards the cage 17 by a spring 22 which bears rearwards on a cup 23 and the force of which can be adjusted by moving the cup 23 by means of a threaded rod 24 mounted in the housing 4 and manually actuable by an adjustment wheel or knob 25. The axis of the valve 18 and of the pressure regulator piston 21 is substantially orthogonal to the axis of the mounting base 2. The low-pressure chamber 26 in front of the piston 21 opens to the outside of the body 1, on the opposite side from the knob 25 of the pressure regulator, via an outlet passage 27 which extends into the body 1 parallel to the axis of the valve 18 and of the piston 21 in the vicinity of the upper end of the latter, in which outlet passage 27 the outlet fitting 3 is mounted, and via a transverse passage 80, orthogonal to the outlet passage 27 and substantially plumb with the passage 11, in which transverse passage 80 the LP pressure gauge 8 is mounted, the latter thus being placed in vertical alignment with the HP pressure gauge 7.

As may be seen in FIG. 3, the body 1 also defines, completely independent of the delivery circuit described hereinabove, a bottle-filling circuit which has a downstream part 28 extending into the base 2, parallel to the axis of the latter, and communicating with an upstream transverse passage 29 in which the filling fitting 6 is mounted, opposite the pressure gauges 7 and 8 and substantially in alignment with the HP pressure gauge 8. The fitting 6 forms a profiled internal passage for housing, downstream, a filter 30, in an intermediate zone, a non-return valve 31 urged by a spring and terminating in an inlet opening 32 designed to accommodate the end, for example the male end, of a filling line, this male end pushing the valve 31 back in order to give free access to the high-pressure filling fluid to the inside of the bottle via the passage 28.

Figure 5:
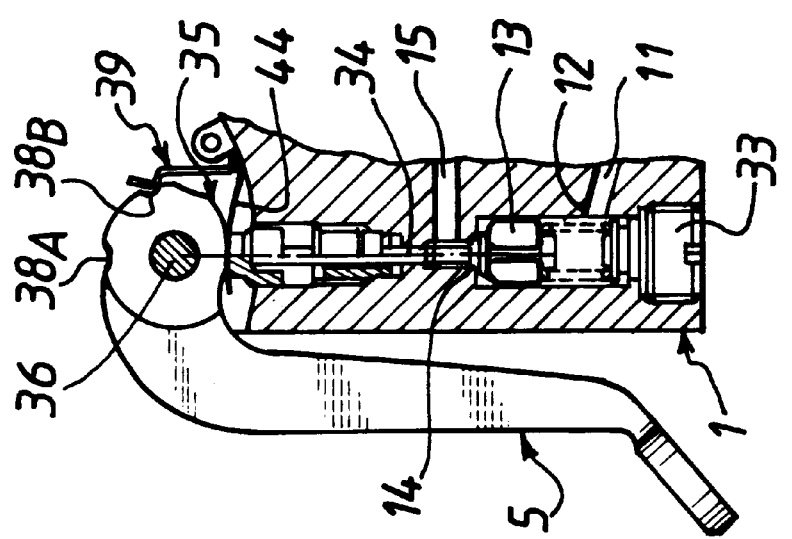
FIG. 5 is a detailed view in partial section along the line of section V—V in FIG. 2.

As may be seen in FIG. 5, at its front end the isolating valve 13, urged towards its seat 14 by a spring bearing on a plug 33 closing the bore 12, includes a finger projecting beyond the seat 14 and acting cooperatively, by pressing, with a rod 34 which passes through a seal and has an outer end emerging outside the body 1 in order to act cooperatively with a cam surface 35 of the pivoting head of the lever 5 which pivots about a transverse pin 36 in a protuberance 37 at the upper end of the body 1 substantially between the pressure gauges 7, 8 and the outlet fitting 3. The head of the lever 5 comprises at least two notches 38A, 38B acting cooperatively with a leaf spring 39 mounted on the body 1 in order to keep the lever 5 in one or other of its extreme, open or closed, positions, thus making it virtually insensitive to vibration. Advantageously, a layer of a material having a low coefficient of friction, or indeed a self-lubricated material, is placed at the interface between the cam surface 35 and the cap of the rod 34, for example by interposing between this cam surface and this cap a polyimide strip solidly fastened, at least during mounting, to the leaf spring 39.

As represented in the drawings, the assembly according to the invention advantageously furthermore comprises a pressure check valve 40 in the upstream end of the passage 9 in the base 2, a relief valve 41 in the pressure regulator piston 21 and a non-return valve 42 in the outlet passage 27, as well as a filter upstream of the passage 11 and at the end of the cage 17, respectively.

Figure 7:
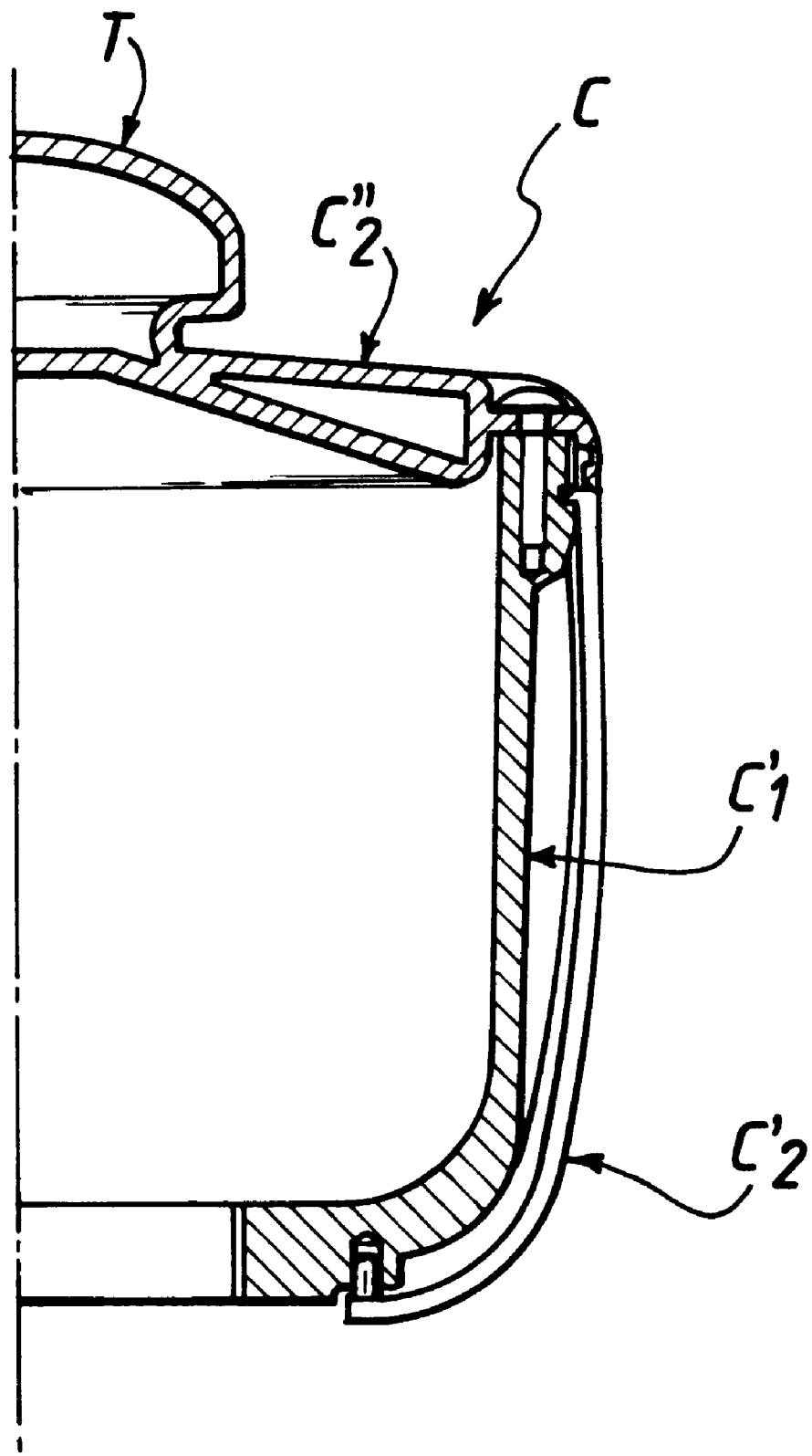
FIG. 7 is a longitudinal half-section of an alternative embodiment of a tap cowl according to the invention.

As may be clearly seen in the drawings, the compact configuration of the tap/pressure regulator assembly, with active members distributed over all the faces of the body 1, enables the assembly to be completely integrated in a cowl forming a bottle bonnet C, the contours of which in one particular embodiment are shown in FIGS. 1 and 2. In this embodiment, the cowl/bonnet C essentially consists of a bottom part $C_1$ mounted on the neck of the bottle 3 around the base 2 and fixed, typically by vertical ties, to a top part $C_2$ in the form of a shell housing essentially all of the tap/pressure regulator assembly and comprising a lateral part forming a handle P and a top head T in the form of a pommel enabling the bottle to be handled, especially by rolling along the ground. The side walls of the top part $C_2$ have a number of cut-outs or recesses $D_1$–$D_4$ as shown diagrammatically in FIG. 2, to allow access to the fittings 3 and 6, the knob 25 and the pressure gauges 7 and 8. The parts $C_2$ and $C_1$ furthermore have a longitudinal slot F allowing the lever 5, which is normally housed in the closed position in the cowl C, to be moved freely between its open and closed positions, as may be seen in FIG. 1. It may also be advantageous to mount, near the bottom of the slot F, an inviolable security device, for example of the tearing type, guaranteeing that the lever 5 has not been actuated before the first time that a full bottle equipped with the tap/pressure regulator assembly according to the invention has been used. At least the top part $C_2$ of the cowl C may be made of an engineering plastic. At least the bottom part $C_1$ may be made of a light metal alloy or of malleable cast iron. In an alternative form, as shown diagrammatically in FIG. 7, the cowl/bonnet consists of an apertured internal cage or bellmouth $C'_1$, typically made of malleable cast iron, fixed to the collar of the bottle, around the base of the tap and extending upwards so as to enclose the tap/pressure regulator assembly with its pressure gauges, and of peripheral $C'_2$ and top $C''_2$ outer cowl elements which are made of plastic and fixed to the cage $C'_1$.

Although the present invention has been described in relation to particular embodiments, it is not thereby limited to them but, on the contrary, is capable of modifications and of alternative forms which will be apparent to one skilled in the art.

We claim:

1. A valve/pressure regulator assembly for a pressurized gas bottle, comprising a body having a base portion having an axis for mounting on and coaxially with a neck portion of a bottle, the body supporting a shut-off valve, a pressure regulator, and a gas outlet fitting, all encompassed in a protecting hood mounted on and coaxially with the bottle, said hood having a closed upper part.

2. The assembly of claim 1, wherein the hood has a top head for handling the bottle.

3. The assembly of claim 1, wherein the hood has a lateral handle for carrying the bottle.

4. The assembly of claim 1, wherein the hood has lateral windows to give access to the shut-off valve, the pressure regulator and the outlet fitting.

5. The assembly of claim 1, wherein the hood is at least partly made of plastic material.

6. A valve/pressure regulator assembly for a pressurized gas bottle, comprising an integral body having a base portion for mounting on a gas bottle, the body defining a first gas circuit having an upstream portion in communication with the inner volume of the gas bottle and including a shut-off valve, and a downstream portion including a pressure regulator and in communication with a gas outlet, control means for manually adjusting the pressure regulator, and actuating means, movably supported on the body, for actuating the shut-off valve between an open position opening the upstream portion of the first gas circuit and a closed position closing the first gas circuit.

7. The assembly of claim 6, wherein the body defines a second gas circuit (28, 29), separate from the first gas circuit, in order to allow filling of a bottle (B) when the unit is mounted on the bottle.

8. The assembly of claim 6, wherein the base portion has a symmetry axis and the pressure regulator has an axis substantially orthogonal to the axis of the base portion.

9. The assembly of claim 6, wherein the gas outlet opens to the outside adjacent the end of the body opposite to the base portion.

10. The assembly of claim 9, wherein the gas outlet opens to the outside on a side of the body opposite the control means for adjusting the pressure regulator.

11. The assembly of claim 7, including two pressure indicators on a same side of the body and which communicate respectively with the upstream and downstream circuit portions.

12. The assembly of claim 11, wherein the second gas circuit opens to the outside on a side of the body opposite the pressure indicators.

13. The assembly of claim 6, wherein the actuating means for actuating the shut-off valve comprise a lever pivotally supported on the body.

14. The assembly of claim 13, wherein the lever comprises a cam surface acting cooperatively with an actuating assembly mechanically coupled to the shut-off valve.

15. The assembly of claim 6, wherein at least one of the upstream and downstream gas circuit portions incorporates a non-return valve.

16. The assembly of claim 7, wherein the second circuit comprises a non-return valve.

17. The assembly of claim 6, wherein the pressure regulator has a sliding piston and a relief valve mounted in the piston.

18. The assembly of claim 7, further including a protective hood mounted on the bottle so as to surround the assembly and forming a bottle-handling bonnet.

19. The assembly of claim 18, wherein the valve/pressure regulator assembly is completely housed in the hood, the hood having windows for access to the valve/pressure regulator assembly.

20. The assembly of claim 19, wherein said actuating means comprise a lever pivotally supported on the body and the hood has a lateral slot accommodating the lever.

21. The assembly of claim 18, wherein the hood is at least partially made out of plastic material.

* * * * *